(12) United States Patent
Schneider

(10) Patent No.: US 6,480,175 B1
(45) Date of Patent: Nov. 12, 2002

(54) METHOD AND SYSTEM FOR ELIMINATING ARTIFACTS IN OVERLAPPED PROJECTIONS

(75) Inventor: Bengt-Olaf Schneider, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/398,026

(22) Filed: Sep. 17, 1999

(51) Int. Cl.[7] .................................................. H04N 5/66
(52) U.S. Cl. ......................................... 345/32; 348/383
(58) Field of Search ............................. 345/1.1, 63, 4, 345/5, 9; 359/630; 348/383, 36, 38; 382/274, 275, 284, 298–310

(56) References Cited

U.S. PATENT DOCUMENTS

| | | | | |
|---|---|---|---|---|
| 4,974,073 A | * | 11/1990 | Inova | 348/123 |
| 5,485,563 A | * | 1/1996 | Fisher | 395/139 |
| 5,576,725 A | | 11/1996 | Shimada | 345/32 |
| 5,956,000 A | * | 9/1999 | Kreitman et al. | 345/1.3 |
| 6,008,820 A | * | 12/1999 | Chauvin et al. | 345/502 |
| 6,017,123 A | * | 1/2000 | Bleha et al. | 353/30 |
| 6,115,022 A | * | 9/2000 | Mayer et al. | 345/418 |
| 6,222,593 B1 | * | 4/2001 | Higurashi et al. | 315/368.12 |
| 2001/0022651 A1 | * | 9/2001 | Kubota et al. | 353/94 |

* cited by examiner

Primary Examiner—Vijay Shankar
Assistant Examiner—Nitin Patel
(74) Attorney, Agent, or Firm—McGinn & Gibb, PLLC

(57) ABSTRACT

A method (and system) of eliminating visible artifacts in overlapped projections produced by a plurality of projectors, includes in areas outside of the overlap areas, raising an intensity of predetermined color pixels to match a level of the predetermined color in the overlap areas, and simultaneously with the raising of the intensity, scaling values of pixels in the overlap areas such that the values do not exceed the maximum pixel value of a single projector of the plurality of projectors.

45 Claims, 5 Drawing Sheets

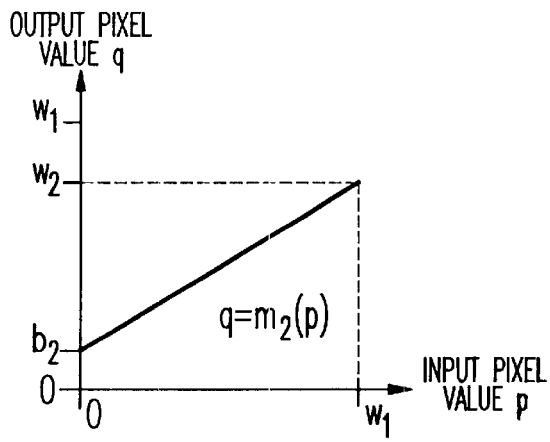
FIG.6
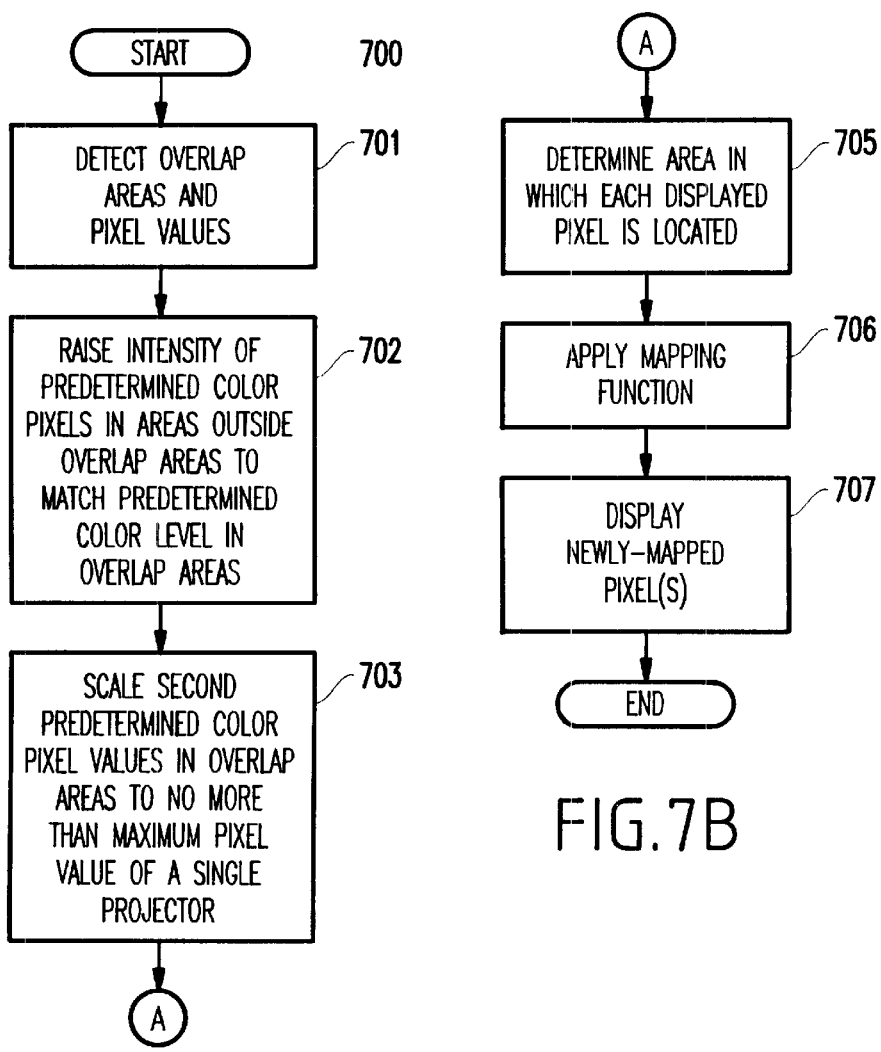
FIG.7A
FIG.7B

METHOD AND SYSTEM FOR ELIMINATING ARTIFACTS IN OVERLAPPED PROJECTIONS

BACKGROUND OF THE INVENTION

1. Field of the Invention

The present invention generally relates to a projection system, and more particularly to a method and system for eliminating artifacts in overlapped projections.

2. Description of the Related Art

Recently, large display walls have been constructed using multiple projectors that each project their images onto a large screen. Typically, each projector in such a system provides parts of the image, thus composing the image from several "tiles".

To avoid visible seams (e.g., discontinuities) in the composite image, projectors are typically arranged such that their projected images slightly overlap. Pixels in the overlapping areas are attenuated such that their relative contributions add up to 1. Thus, each projector provides a certain percentage (e.g., a relative contribution) of the final pixel color/intensity. Thus, ideally (e.g., in theory), such attenuation makes the overlap areas invisible to a viewer. That is, black pixels (e.g., having a value of 0) must be produced to avoid such discontinuities. Hence, imagine that in the overlap area, one projector provides 100 percent of the intensity. Then, the other projector must generate 0 percent intensity (i.e., an ideal black pixel). Such situation occurs at the edges of the overlap area (e.g., see FIG. 2)).

Unfortunately, "real-world" (e.g., practical) projectors cannot produce perfectly black pixels. That is, although the input value for a given pixel may be 0, the projector still emits a small amount of light for those pixels. This is due, for example, to imperfections in the light valves used in liquid crystal display (LCD) projectors or residual phosphorescence in cathode ray tube (CRT) projectors.

As a result of such projections, seams are visible where the "tiles" (e.g., images) generated by different projectors overlap. Such seams are visually distracting and can potentially convey information to the viewer that is not part of the image but purely an artifact of the overlapping tiles.

FIG. 1 illustrates a concrete example of the above-mentioned problem. That is, a conventional system uses multiple projectors 101–106 that project their respective images 107–112 onto a common projection screen 100. These images 107–112 are also referred to as "tiles". Separate processors/computers 113–118 provide the pixel information to each of the projectors. Computers 113–118 can be totally independent of each other, or can be in communication with each other over a network, or can be connected to a central controller that determines their operation.

To ease registration of the tiles, the tiles produced by the projectors typically overlap. Depending on the number of projectors and their overlap, this creates areas that are illuminated by one, two or four projectors 119–121. Each projector modulates the intensities of the pixels in the overlap areas, in order to provide a smooth transition between pixels provided by the contributing projectors.

FIG. 2 illustrates two out of many possible blending functions (e.g., linear roll-off and cosine-square roll-off). For pixels in the overlap area, the pixel value is multiplied by the blending function. As can be seen from FIG. 2, the blending functions used by neighboring projectors add up to 1, thus creating the visual impression of a smooth transition between tiles.

FIG. 3 shows an example of pixels positioned along a scanline. The graph 301 shows the computed pixel intensities for the scanline. Graphs 302 and 303 illustrate the pixel intensities after ideal modulation with the blending functions for the two projectors. Finally, graph 304 shows the sum of the modulated pixels. The sum of the modulated pixels is the same as the computed pixel values.

FIG. 4 shows the relationship between the specified pixel value and the displayed intensity (e.g., computed value vs. actual/real displayed value). Graph 401 shows an ideal mapping of pixel values to intensities, which graph 402 shows a more realistic mapping. It is noted that even an input pixel value of 0 results in a non-zero intensity on the display. Further, real mappings from pixel values to intensities also are frequently non-linear.

FIG. 5 shows the non-ideal case. FIG. 501 shows again the computed pixel intensities for the scanline. Graphs 502 and 503 show the effect of a non-perfect display of black pixels (e.g., even black pixels have some non-zero intensity in that pixel intensities will not assume a value of 0 in spite of a blending function value of 0. That is, the pixels do not assume a value of 0 because of the imperfection in the projector (e.g., leaking liquid crystal displays (LCDs) or persistence of phosphor in CRTs). Graph 504 shows the effect of summing up the modulated pixel values. It is noted that the pixel intensities in the overlap area are too large, thereby creating the effect of visible seams in the composite image.

Thus, hitherto the present invention, the conventional systems suffer from the problem of producing visible seams which is annoying and in which the viewer may be given wrong information as a result of such increased intensity.

SUMMARY OF THE INVENTION

In view of the foregoing and other problems of the conventional methods and structures, an object of the present invention is to provide a method and structure in which the artifacts such as seams are eliminated.

In a first aspect of the invention, a method of eliminating visible artifacts in overlapped projections produced by a plurality of projectors, includes in areas outside of the overlap areas, raising an intensity of first predetermined color pixels to match a level of the first predetermined color in the overlap areas, and scaling values of second predetermined color pixels in the overlap areas such that the values do not exceed the maximum pixel value of a single projector of the plurality of projectors.

In a second aspect of the present invention, a projection system includes a display screen, a plurality of projectors each for producing a respective image portion for being displayed on the screen, a plurality of image portions forming a composite image having a plurality of pixels, the plurality of image portions having overlapping image areas, and means, coupled to the projectors, for adjusting an intensity of predetermined ones of the pixels across the screen to achieve uniform intensity of the predetermined pixels.

In another aspect of the present invention, a signal-bearing medium incorporating the inventive method is provided.

With the unique and unobvious features of the invention, visible seams and artifacts are efficiently and reliably eliminated. Further, while the invention can be implemented in a combination of software and hardware, the present invention also may be advantageously implemented in software only. Thus, in such a case, the present invention would not require any additional hardware.

BRIEF DESCRIPTION OF THE DRAWINGS

The foregoing and other purposes, aspects and advantages will be better understood from the following detailed description of a preferred embodiment of the invention with reference to the drawings, in which:

FIG. 6 illustrates mapping of input pixel values to output pixel values according to a first preferred embodiment of the method of the present invention;

FIG. 7A illustrates an exemplary flow diagram of a calibration process according to the method of the first preferred embodiment of the present invention;

FIG. 7B illustrates an exemplary flow diagram of a pixel mapping process according to the method of the first preferred embodiment

DETAILED DESCRIPTION OF PREFERRED EMBODIMENTS OF THE INVENTION

Figure 1:
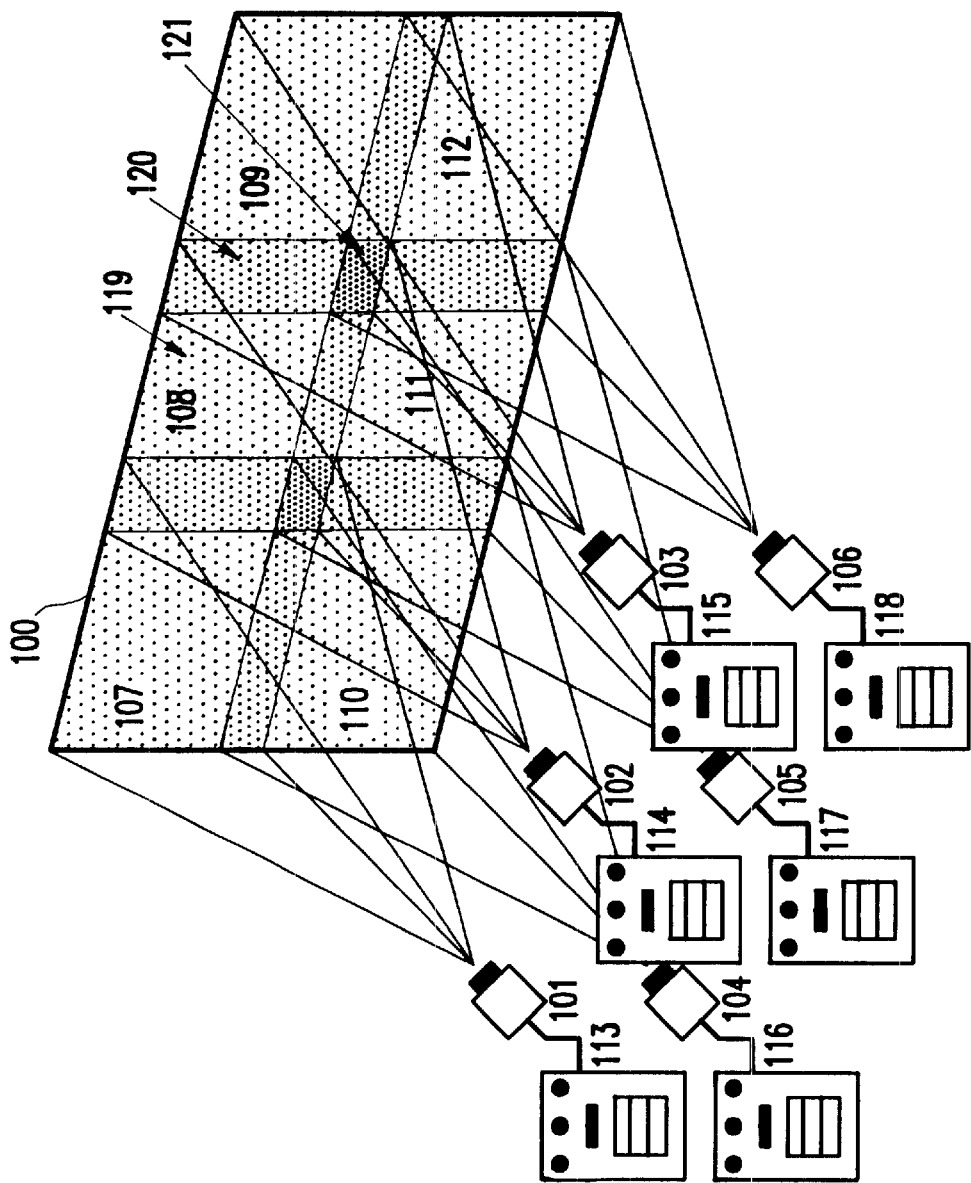
FIG. 1 illustrates a concrete example of a conventional system having a problem of visible seams and artifacts.
Figure 2:
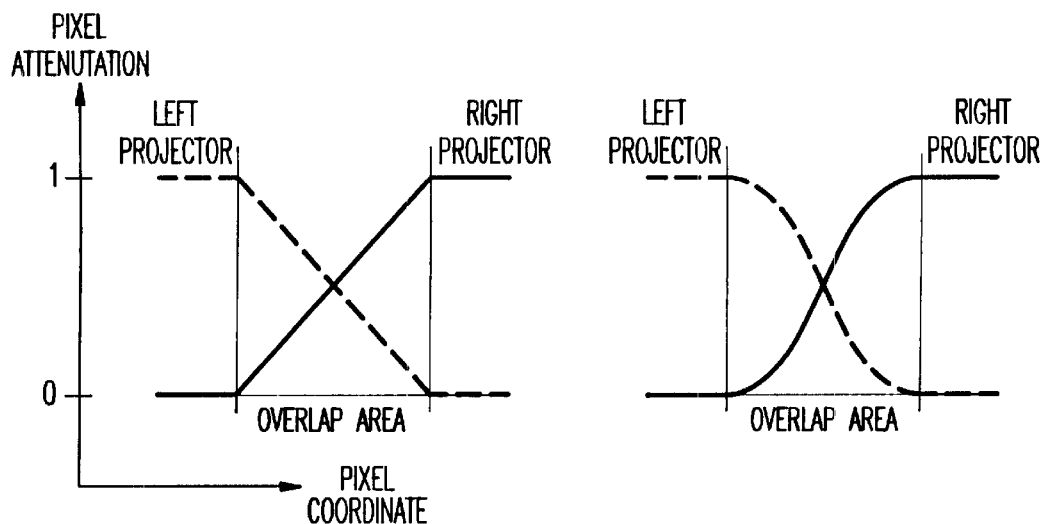
FIG. 2 illustrates several exemplary conventional blending functions (e.g., linear roll-off and cosine-square roll-off) for reducing artifacts and seams.
Figure 3:
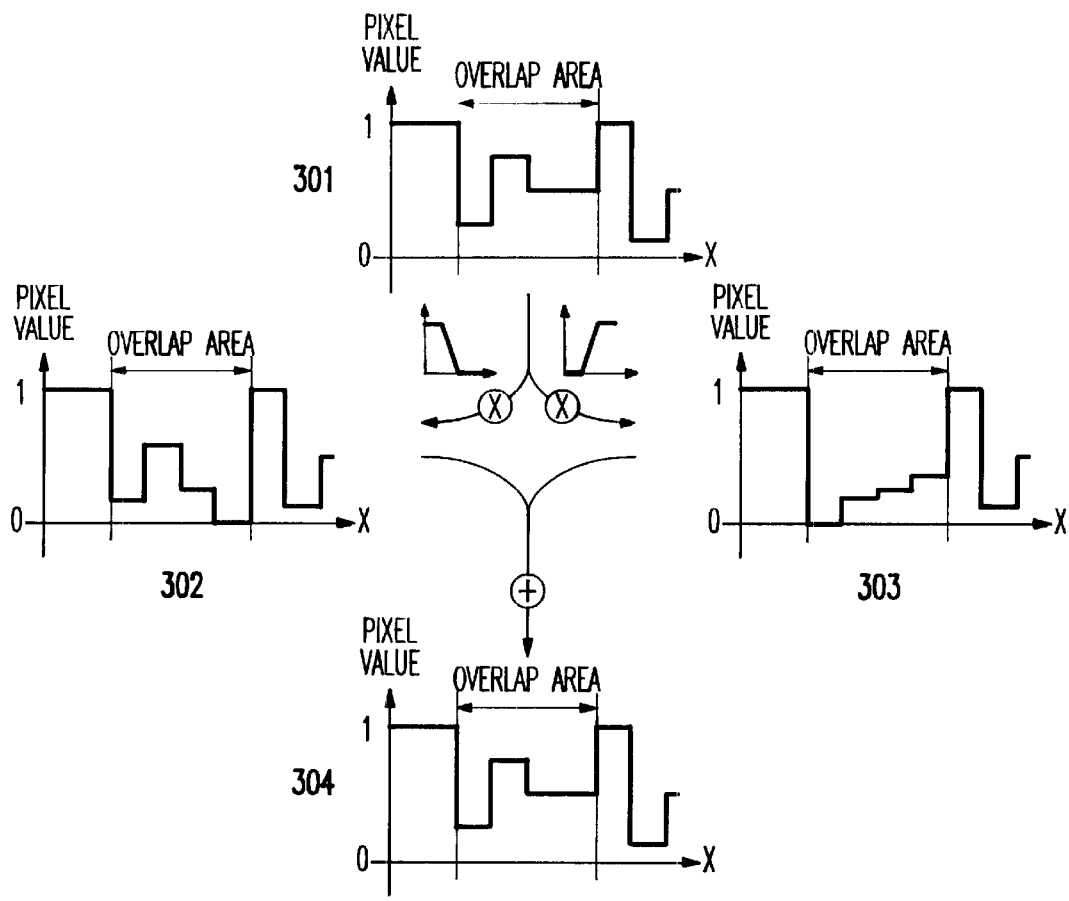
FIG. 3 shows an example of pixels positioned along a scanline, with graph 301 illustrating computed pixel intensities for the scanline, graphs 302 and 303 illustrating the pixel intensities after ideal modulation with the blending functions for the two projectors, and graph 304 showing the sum of the modulated pixels.
Figure 4:
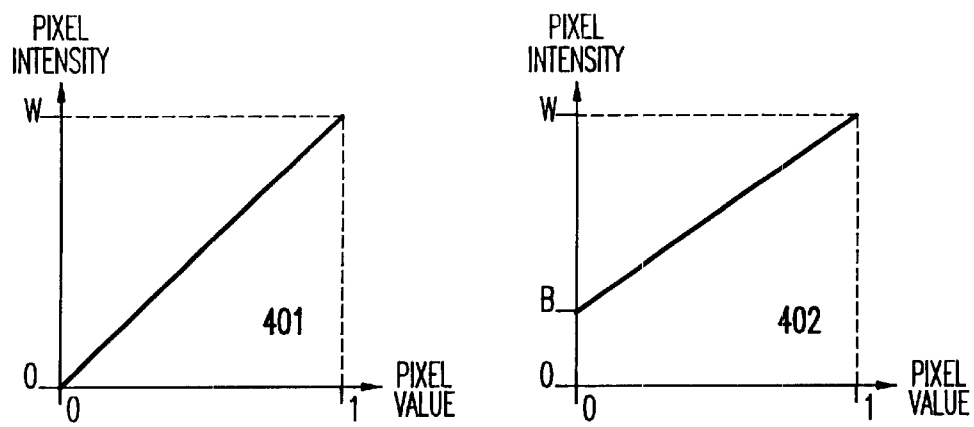
FIG. 4 illustrates a relationship between the specified pixel value and the displayed intensity, with graph 401 showing an ideal mapping of pixel values to intensities, and graph 402 showing a more realistic mapping.
Figure 5:
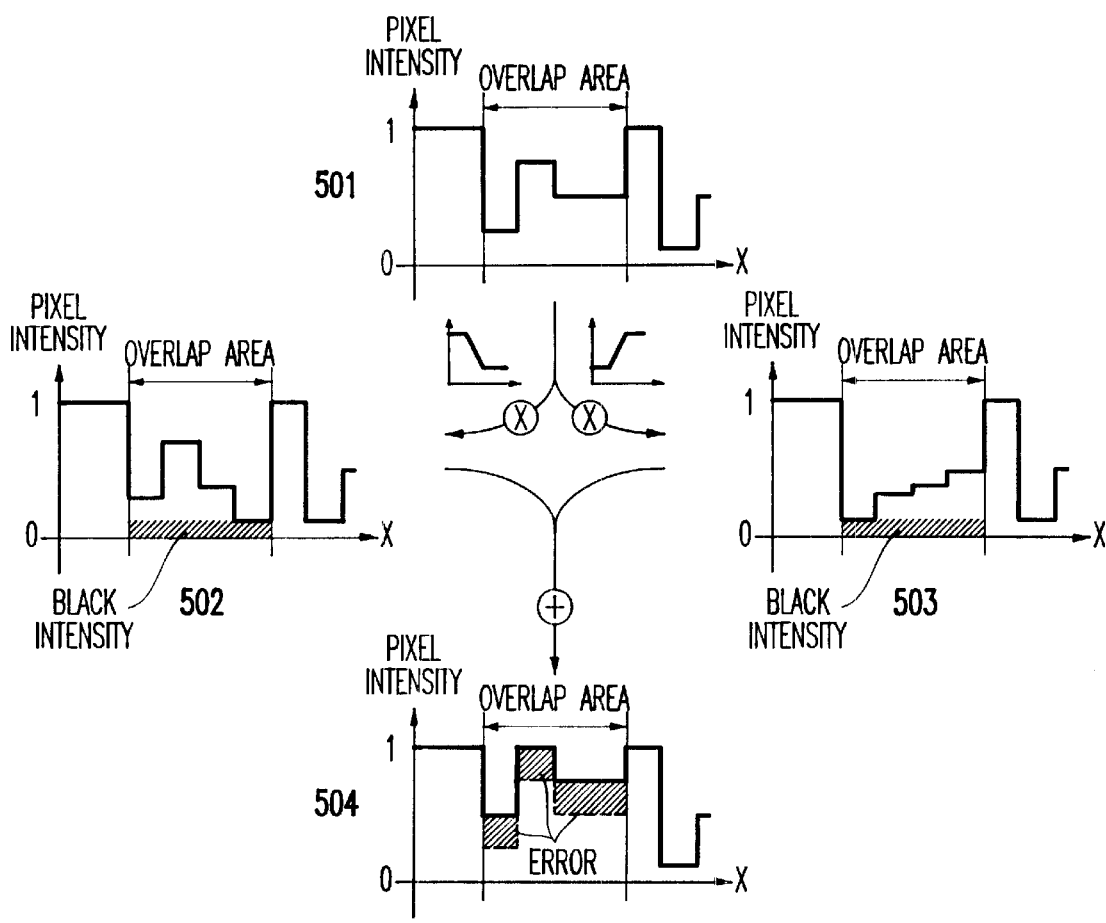
FIG. 5 shows a non-ideal case, in which graph 501 shows again the computed pixel intensities for the scanline, graphs 502 and 503 show the effect of a non-perfect display of black pixels, and graph 504 shows the effect of summing up the modulated pixel values.

Referring now to the drawings, and more particularly to FIGS. 1–6, there are shown preferred embodiments of the method and structures according to the present invention.

PREFERRED EMBODIMENT

To eliminate the above-mentioned problem and other problems of the conventional systems and methods, the invention generally takes the following basic approach.

First, in areas outside of the overlap areas, the intensity of black pixels is raised to match the black level in the overlap areas. Thereafter, the pixel values are scaled in the overlap areas such that they never exceed the maximum pixel value of a single projector. In practice, the maximum pixel value is usually limited to either 1.0 or 255 (e.g., for 8 bits). It is noted that the above-described sequence may be reversed. That is, the scaling of the white pixels may be performed first, and then in areas outside of the overlap areas, the intensity of black pixels may be raised to match the black level in the overlap areas.

Hereinbelow, the following conventions and symbols will be used:

| | |
|---|---|
| Intensity of "black" pixels: | B (i.e., for input pixel value 0) |
| Pixel values to produce intensity n × B: | $b_n$ |
| Intensity of "white" pixels: | W |
| Pixel values to produce intensity W – (n – 1) × B: | $w_n$ |

It is noted that "pixel value" is different from "intensity". That is "pixel value" refers to the input to the system, whereas the intensity is the luminance/brightness of the pixels displayed on the display screen (e.g., what is shown on the display). Pixel values are computed by the application at the graphics subsystem and written into the frame buffer.

Since up to 4 tiles are overlapping at a given pixel, the maximum intensity of a black pixel is 4B. The present invention aims to establish a uniform intensity of black pixels across the entire screen. Therefore, black pixels that are covered by only one or two tiles, must also be displayed with the intensity 4B.

In areas covered by only a single tile, the pixel value of black pixels must therefore be set to $b_4$. For pixels covered by two tiles, black pixels output by a single projector must each have the intensity 2B, i.e. their corresponding pixel values are $b_2$.

Similarly, it must be ensured that fully illuminated pixels (e.g., white pixels) have the same intensity everywhere on the projection screen. This intensity is determined by the maximum pixel intensity that a single projector can produce (e.g., pixels with a value of $w_1$). White pixels in overlap areas must not exceed this intensity.

Therefore, in overlapping areas, the maximum pixel values must be limited such that the sum of all pixel intensities provided by the projectors does not exceed this maximum.

For example, in an area of 4 overlapping tiles where one projector displays a white pixel and the other 3 projectors produce black pixels, the white pixel's intensity must not exceed W-3B, because each of the three (3) black pixels contributes light of intensity B.

The corresponding pixel values are tabulated below:

| Tiles/pixel | Pixel value to produce 4B with n projectors | Pixel value to produce W with n projectors |
|---|---|---|
| 1 | $b_4$ | $w_1$ |
| 2 | $b_2$ | $w_2$ |
| 4 | $b_1$ | $w_4$ |

Consequently, the range of pixel values from $0 \ldots w_1$, must be mapped to $b_4 \ldots w_1$, $b_2 \ldots w_2$, and $b_1 \ldots w_4$ respectively. Hereinbelow, linear mapping functions $m_1$, $m_2$ and $m_4$ (e.g., for 1, 2, and 4 overlapping tiles, respectively) are provided that compute an output pixel value for a given input pixel value p:

$$m_1(p) = \frac{w_1 - b_4}{w_1} p + b_4 \quad (1)$$

$$m_2(p) = \frac{w_2 - b_2}{w_1} p + b_2$$

$$m_4(p) = \frac{w_4 - b_1}{w_1} p + b_1$$

FIG. 6 illustrates the mapping of input pixel values to output pixel values according to the present invention. These mappings ensure that black and white pixels are displayed with uniform intensity across the entire screen, including overlap areas.

FIG. 7A illustrates an exemplary flow diagram of a calibration process according to the method of the first preferred embodiment of the present invention.

That is, in the inventive method 700, as shown in FIG. 7, in step 701, the overlap areas and the pixel values of the pixels in the overlap areas and the non-overlapped areas are detected and measured.

In step 702, in areas outside of the overlap areas, the intensity of black pixels is raised to match the black level in the overlap areas. Afterwards, in step 703, the pixel values are scaled in the overlap areas such that they never exceed the maximum pixel value of a single projector. Once again, it is noted that steps 702 and 703 may be reversed and the calibration effect can still be achieved. Thus, the calibration process is performed in a two-stage process for each projector, as desired and as deemed necessary by the user.

Referring to FIG. 7B, the process of remapping the pixel values across the entire screen is shown.

The process ends with a uniform intensity achieved across the display, without visible seams or artifacts.

Referring to FIG. 7B, an exemplary process is shown for performing a pixel remapping function, after the calibration process of FIG. 7A has been performed. That is, all of the pixel values are remapped across the entire display screen.

In FIG. 7B, in step 705, for every pixel displayed on the screen, it is determined in what area the displayed pixel is located (e.g., overlap portion or non-overlap portion).

In step 706, a mapping function is applied. Such a mapping function preferably linear mapping functions including a scaling and an offset operation. Such linear mapping functions include, for example, alpha blending and color tables, as described in further detail below.

In step 707, the newly-mapped pixels are displayed on the screen.

Thus, the method according to the present invention includes a calibration process and an actual pixel adjustment. That is, the manipulation of predetermined color (e.g., black/white) values is used during calibration to set up the transfer function. The transfer function is then used to remap any possible pixel value (e.g., not just black or white).

The above-mentioned steps are described in further detail below.

Figure 8:
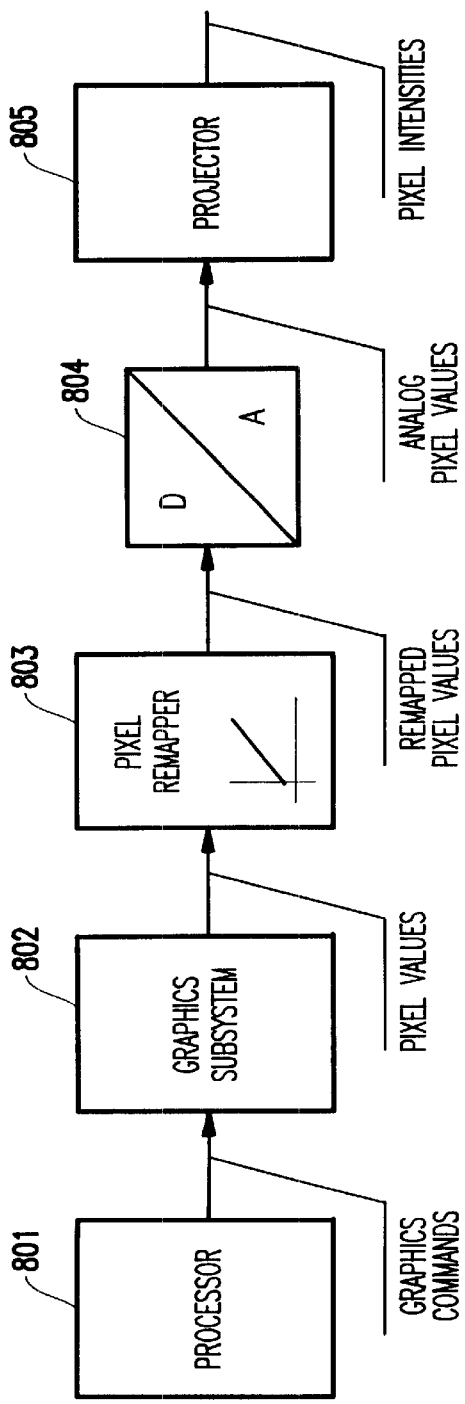
FIG. 8 illustrates a block diagram of an exemplary system for mapping input pixel values to output pixel values.

FIG. 8 illustrates a block diagram of an exemplary system 800 for mapping input pixel values to output pixel values.

As shown in FIG. 8, a processor 801 (e.g., any of processors 113—118 shown, for example, in FIG. 1) computes an image, and provides graphics commands to a graphics subsystem 802. For example, the image computed by the processor and provided to the graphics subsystem 802, may be in the form of a plurality of triangles or the like.

Based on the received graphics commands, the graphics subsystem 802 divides the "triangles" (image) into, for example, a plurality of pixels and associated pixel values, and provides an output representative thereof to a pixel remapper 803.

The pixel remapper 803 remaps all of the pixels of the image based on the parameters of the remapping function set up during the calibration step (e.g., raising the intensity of black pixels and scaling the white pixels as described above).

It is noted that the pixel remapper 803 may include therein an alpha blending capability or other similar mapping function (e.g., color tables described below).

Then, the remapped pixel values are input to a digital-to-analog (D/A) converter 804 which converts the digital remapped pixel values to analog pixel values. The analog pixel values are input to a projector 805, which in turn outputs the pixel intensities onto the image display screen.

Returning to FIG. 6, the mapping of input pixel values to output pixel values is shown according to the present invention. As mentioned above, these mappings ensure that black and white pixels are displayed with uniform intensity across the entire screen, including the overlap areas.

However, due to the non-linear transfer functions of physical projectors, there maybe slight variations in intensity for intensities between black and white. Using mapping functions that match the projectors transfer function could alleviate such variations. Another possibility to eliminate such variations is to rely on a gamma correction table in the projector or the graphics adapters driving the projector that linearizes its transfer function.

The exact transfer function is often not readily available to a user. Therefore, the true values of the parameters $w_i$ and $b_i$ must be determined experimentally. The following describes a simple procedure for such an experimental determination.

First, the mapping functions (e.g., $m_i(p)=p$), are disabled. Then, the black pixels are displayed with all projectors (e.g., $p=0$ for all pixels (x,y)).

Thereafter, the value of pixels are incremented in areas with two (2) overlapping tiles until their intensity matches the intensity of pixels in areas with four (4) overlapping tiles. This is pixel value $b_2$.

The value of pixels are incremented in areas with no overlapping tiles until their intensity matches the intensity of pixels in areas with four (4) overlapping tiles. This is pixel value $b_4$.

Then, white pixels are displayed with all projectors (e.g., one projector at a time, while the other projectors are set to black; that is, adjust the overlap areas for one projector, then proceed to a next projector and perform similar operations) (e.g., p=w) for all pixels (x,y), and the value of pixels are decremented in areas with 2 overlapping tiles until their intensity matches the intensity of pixels with no overlapping tiles. This is pixel value $w_2$.

Thereafter, the value of pixels are decremented in areas with four (4) overlapping tiles until their intensity matches the intensity of pixels with no overlapping tiles. This is pixel value $w_4$.

Finally, using the values $w_i$ and $b_i$, the mapping functions $m_i$ are established.

The mapping functions computed by equations (1) and set-up in the final step above, involve both a scaling and an offset operation. There are several ways to implement the mapping functions depending on the facilities offered by the underlying hardware and graphics libraries. Hereinbelow, two possibilities are described (e.g., color tables and alpha blending).

Provided different color maps can be defined for different screen areas, the use of color tables is a straightforward way to implement the mapping functions (e.g., see J. Foley et al., "Computer Graphics: Principles and Practice", $2^{nd}$ Edition, Addison Wesley, 1990). A color table (e.g., possibly one or each color channel, as described below) is set up such that for each input pixel value it produces the desired output pixel value. Unfortunately, few graphics adapters offer multiple independent color maps.

Alpha blending is a technique of combining two pixels of different color. Typically, one of the pixels is stored in a frame buffer and the image generation process (e.g., rendering) produces the other pixel (e.g., see "OpenGL Reference Manual", $2^{nd}$ Edition, R. Kempf and C. Frazier (eds.), Addison Wesley, 1998.).

Each pixel is described by an intensity (or color value, as described below) and an alpha value. The alpha value is in the range 0, ... 1, and represents (e.g., can be interpreted as) the opacity of a pixel. The new pixel value stored in the frame buffer is computed by combining the incoming pixel intensity and alpha with the stored pixel intensity and alpha: $p:=k_1p+k_2q$, where p is the stored pixel intensity/alpha and q is the incoming pixel intensity/alpha. The factors $k_1$ and $k_2$ are arbitrary scale factors between 0 and 1. Usually, the resulting incoming pixel value p is clamped to the range 0, ... w, i.e., all values exceeding the clamp values are limited or cut to the clamp value.

The process of alpha blending is used to implement the mapping functions as follows. It is noted that each mapping function is in the form ap+b (see equation (1) above).

First, the image is generated using a rendering algorithm of choice. Now, the frame buffer contains at every pixel the unmapped pixel intensity. Then, the blending function $p \cdot \alpha_q + q \cdot 1$ (e.g., $k1=\alpha_p$ and $k_2=1$) is set up. This blending function computes the new pixel value by first multiplying the current pixel value with the alpha-value of the incoming pixel and then adding the new pixel value.

Finally, a rectangle is rendered for every screen region (e.g., one for each region that has 1, 2 or 4 overlapping tiles). For each rectangle, the alpha value is set to the corresponding scale factor a and the color value to the offset value b (e.g., for a region with 2 overlapping tiles $\alpha=(w_2-b_2)/w_1$ and $b=b_2$). After rendering the rectangles, the frame buffer contains the properly mapped pixel values and can be projected to the screen.

Regarding color, typically images are represented with color pixels. The description of the method of the present invention thus has been only concerned with single-valued pixels (e.g., grey-scale images). Color images are typically composed of pixels with 3 components or color channels (e.g., red, green, and blue (RGB)). The method described above can be applied by creating the image as three separate grey-scale images and applying to the mapping function to each of the color channels.

The method of the present invention introduces small color shifts into the image due to the offset in color values introduced by the mapping functions. For small values of $b_0$, $b_2$, and $b_4$, these errors will be small.

The offset added to the original pixel value by the mapping functions is added uniformly to all color channels. This is equivalent to adding some white to the pixel color (e.g., the pixel color will become more pastel). For example, assume an input pixel with an RGB value of (0.05, 0.0, 0.0), and assume $b_4=0.01$ and $w_1=1.0$. Then, $m_1(p)=0.99$ p+0.01 (e.g., the pixel gets mapped to the RGB value (0.0495, 0.01, 0.01)). The original dark red pixel was mapped into a slightly darker and less saturated red.

Obviously, this effect will only be significant if the intensity of black pixels B is high. The relative error will be greatest for dark pixels. Fortunately, the human visual system is less sensitive to color differences at low intensities, so that the error will have minimal visual impact.

Figure 9:
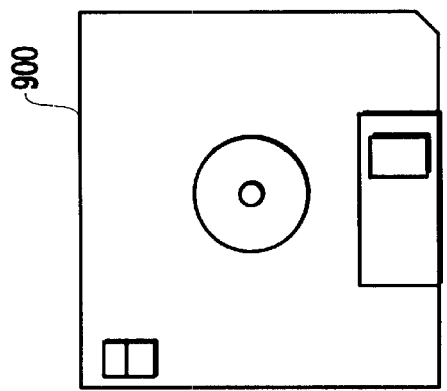
FIG. 9 illustrates a storage medium for storing steps of the program for eliminating visible artifacts in overlapped projections.

As shown in FIG. 9, in addition to the hardware and process environment described above, a different aspect of the invention includes a computer-implemented method for eliminating visible artifacts in overlap projections produced by a plurality of projectors, as described above. As an example, this method may be implemented in the particular hardware environment discussed above.

Such a method may be implemented, for example, by operating a central processing unit (CPU) included in the processor(s)/computer(s) shown in FIG. 8, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware above, to perform a method of eliminating visible artifacts in overlap projections produced by a plurality of projectors, as described above.

This signal-bearing media may include, for example, a RAM (not shown) contained within the CPU, as represented by the fast-access storage for example. Alternatively, the instructions may be contained in another signal-bearing media, such as a magnetic data storage diskette 900 (FIG. 9), directly or indirectly accessible by the CPU.

Whether contained in the diskette 900, the computer/processor 801/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of a preferred embodiment, those skilled in the art will recognize that the invention can be practiced with modification within the spirit and scope of the appended claims.

What is claimed is:

1. A method of eliminating visible artifacts in overlapped projections produced by a plurality of projectors, comprising:
    performing a calibration process comprising:
        adjusting an intensity of first predetermined color pixels in areas outside of overlap areas to match an intensity of the first predetermined color pixels in the overlap areas; and
        scaling values of second predetermined color pixels in the overlap areas such that said values do not exceed a maximum pixel value of a single projector of said plurality of projectors.

2. The method according to claim 1, wherein said adjusting said intensity of said first predetermined color pixels is for calibration of said projector for developing a set of transfer functions.

3. The method according to claim 2, further comprising:
    using said transfer functions to remap any possible pixel value across a display screen.

4. The method according to claim 1, wherein said first predetermined color pixels comprise black pixels.

5. The method according to claim 1, wherein said second predetermined color pixels comprise white pixels.

6. The method according to claim 1, further comprising:
    performing a mapping function to change a value of said first and second predetermined color pixel values to achieve said uniform intensity.

7. The method according to claim 6, wherein said mapping function comprises a linear mapping function.

8. The method according to claim 7, further comprising: determining and calibrating parameters of the linear mapping function.

9. The method according to claim 7, wherein said performing a mapping function comprises using a plurality of color maps for said mapping function.

10. The method according to claim 7, wherein said performing a mapping function comprises using alpha blending for said mapping function.

11. The method according to claim 10, wherein said alpha blending for implementing the mapping functions comprises generating an image using a rendering such that said frame buffer includes at every pixel an unmapped pixel intensity.

12. The method according to claim 10, wherein a function of said alpha blending function includes p·αp+q·1, and
wherein said blending function computes an incoming pixel value by first multiplying a current stored pixel value with the alpha-value of the incoming pixel and then adding the incoming pixel value.

13. The method according to claim 6, wherein said mapping function is selected such that said mapping function matches a transfer function of a respective projector of said plurality of projectors.

14. The method according to claim 6, wherein said mapping function comprises a scaling and an offset operation.

15. The method according to claim 14, wherein said mapping function is computed by $$m_1(p) = \frac{w_1 - b_4}{w_1} p + b_4 \quad (1)$$

$$m_2(p) = \frac{w_2 - b_2}{w_1} p + b_2$$

$$m_4(p) = \frac{w_4 - b_1}{w_1} p + b_1.$$

16. The method according to claim 14, wherein said mapping function defines different color maps for different areas of said screen, and
wherein a color table is set up such that for each input pixel value a desired output pixel value is produced.

17. The method according to claim 15, wherein a function of said alpha blending function comprises p· p+q·1, and
wherein said blending function computes the incoming pixel value by first multiplying the current stored pixel value with the alpha-value of the incoming pixel and then adding the incoming pixel value.

18. The method according to claim 17, wherein, after writing to an alpha plane in the frame buffer is disabled, a predetermined shape is rendered for every screen region having an overlapped portion, and
wherein for each predetermined shape, the alpha value is set to the corresponding scale factor p and the color value to the offset value q and after rendering the predetermined shapes, the frame buffer contains the properly mapped pixel values and is projected to the screen.

19. The method according to claim 18, wherein said predetermined shapes comprises a rectangle adjacent respective overlap regions.

20. The method according to claim 1, wherein said adjusting said intensity comprises utilizing a gamma correction table for linearizing a respective transfer function of each of said projectors.

21. The method according to claim 1, further comprising:
remapping input pixel values using a transfer function to display output pixel values on a display screen,
wherein parameters $w_i$ and $b_i$ of said transfer function are determined by disabling said mapping function, and then displaying the first predetermined color pixels by all projectors.

22. The method according to claim 21, wherein said adjusting said intensity, with four overlapping image tiles, increments a value of pixels in areas with two overlapping tiles until their intensity matches the intensity of pixels in areas with four overlapping image tiles, said pixel value being represented by $b_2$.

23. The method according to claim 22, wherein said adjusting said intensity increments the value of pixels in areas with no overlapping tiles until their intensity matches the intensity of pixels in areas with four overlapping tiles, and represents a pixel value thereof by $b_4$.

24. The method according to claim 23, wherein said adjusting said intensity further displays said second predetermined color pixels with one projector at a time, while others of said plurality of projectors are set to said first predetermined color for all pixels, and decrements a value of pixels in areas with two overlapping tiles until their intensity matches the intensity of pixels with no overlapping tiles, wherein a pixel value is represented by $w_2$.

25. The method according to claim 24, wherein said adjusting said intensity further decrements the value of pixels in areas with four overlapping tiles until their intensity matches the intensity of pixels with no overlapping tiles, and represent s a resulting pixel value with $w_4$.

26. The method according to claim 25, wherein said adjusting said intensity uses the values $w_i$ and $b_i$ to establish the mapping functions $m_i$ for said projectors.

27. The method according to claim 1, wherein said scaling of said values of said second predetermined color pixels is performed prior to said adjusting of said intensity of said first predetermined color pixels.

28. A method of eliminating visible artifacts in overlapped projections produced by a plurality of projectors, comprising:
performing a calibration process by adjusting first predetermined color pixels in areas outside of overlap areas, and scaling values of second predetermined color pixels in said overlap areas;
after performing a calibration process for inputs to said projectors, determining areas in which each of a plurality of displayed pixels are located;
applying a mapping function to said displayed pixels; and
displaying said newly-mapped pixels.

29. The method according to claim 28, wherein said performing a calibration process comprises:
prior to said determining said areas, in areas outside of the overlap areas, adjusting an intensity of first predetermined color pixels to match an intensity of the first predetermined color pixels in the overlap areas; and
simultaneously with said adjusting, scaling values of second predetermined color pixels in the overlap areas such that said values do not exceed the maximum pixel value of a single projector of said plurality of projectors.

30. A projection system, comprising:
a display screen;
a plurality of projectors each for producing a respective image portion for being displayed on said screen, a plurality of image portions forming a composite image having a plurality of pixels, said plurality of image portions having overlapping image areas; and
an intensity adjuster, coupled to said projectors, for adjusting an intensity of first predetermined color pixels of said plurality of pixels across said screen, to achieve uniform intensity of said first predetermined color pixels, wherein said system performs a calibration process by adjusting an intensity of said first predetermined color pixels in non-overlapping areas to match an intensity of the predetermined color pixels in the overlapping image area, and scaling values of second predetermined color pixels in the overlapping image area such that said values do not exceed a maximum pixel value of a single prompter of said plurality of projectors.

31. The system according to claim 30, further comprising:

a scalar, coupled to said intensity adjuster, for scaling values of second predetermined color pixels in the overlap areas, simultaneously with said adjusting of said intensity by said intensity adjuster.

32. The system according to claim 31, wherein said predetermined pixels comprise white pixels.

33. The system according to claim 30, wherein said predetermined pixels comprise black pixels.

34. The system according to claim 30, wherein said intensity adjuster performs a mapping function to change a value of said predetermined pixel values to achieve said uniform intensity.

35. The system according to claim 34, wherein said mapping function comprises a linear mapping function.

36. The system according to claim 35, further comprising:

means, coupled to said intensity adjuster, for determining and calibrating parameters of the liner mapping function.

37. The system according to claim 36, wherein said intensity adjuster comprises a plurality of color maps for said mapping function.

38. The system according to claim 36, wherein said intensity adjuster comprises means for alpha blending values of said pixels for said mapping function.

39. The system according to claim 30, further comprising:

means for determining areas in which each of a plurality of displayed pixels are located; and means for applying a mapping function to said displayed pixels, newly-mapped pixels being displayed on said display screen.

40. A projection system, comprising:

a plurality of projectors for projecting image portions onto said screen, at least some of said image portions having overlapping portions;

wherein in areas outside of the overlap areas, an intensity of predetermined color pixels is adjusted to match the predetermined color level in the overlap areas, and simultaneously, the pixel values are scaled in the overlap areas such that they never exceed the maximum pixel value of a single projector.

41. The system according to claim 40, further comprising:

an intensity adjuster for adjusting said intensity of said predetermined color pixels of said image.

42. The system according to claim 40, wherein, in overlapping areas, the maximum pixel values of the predetermined color pixels are limited such that the sum of all pixel intensities provided by the projectors does not exceed said maximum.

43. The system according to claim 40, wherein a mapping function is selected such that said mapping function matches a transfer function of a respective projector of said plurality of projectors.

44. A signal-bearing medium tangibly embodying a program of machine-readable instructions executable by a digital processing apparatus to perform a method for computer-implemented eliminating visible artifacts in overlapped projections produced by a plurality of projectors, said method comprising:

in areas outside of the overlap areas, adjusting an intensity of predetermined color pixels to match an intensity of the predetermined color pixels in the overlap areas; and simultaneously with said adjusting, scaling values of pixels in the overlap areas such that said values do not exceed the maximum pixel value of a single projector of said plurality of projectors.

45. The signal-bearing medium according to claim 44, wherein said method further comprises:

determining areas in which each of a plurality of displayed pixels are located;

applying a mapping function to said displayed pixels; and causing said newly-mapped pixels to be displayed.

* * * * *